Figure 1:
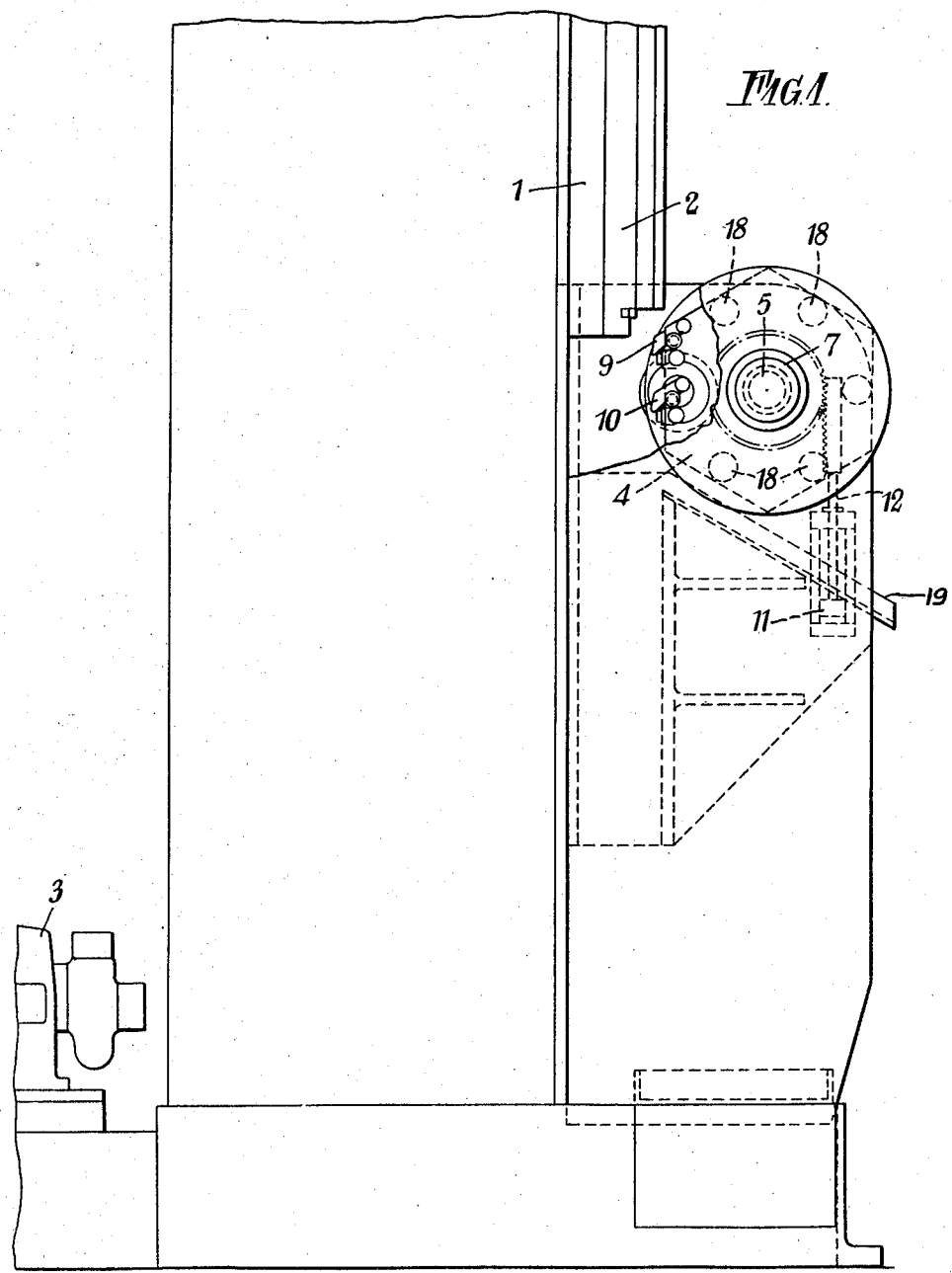

July 7, 1959 C. E. POYNTER 2,893,293
BROACHING MACHINES
Filed June 11, 1956 3 Sheets-Sheet 1

INVENTOR
CYRIL E. POYNTER

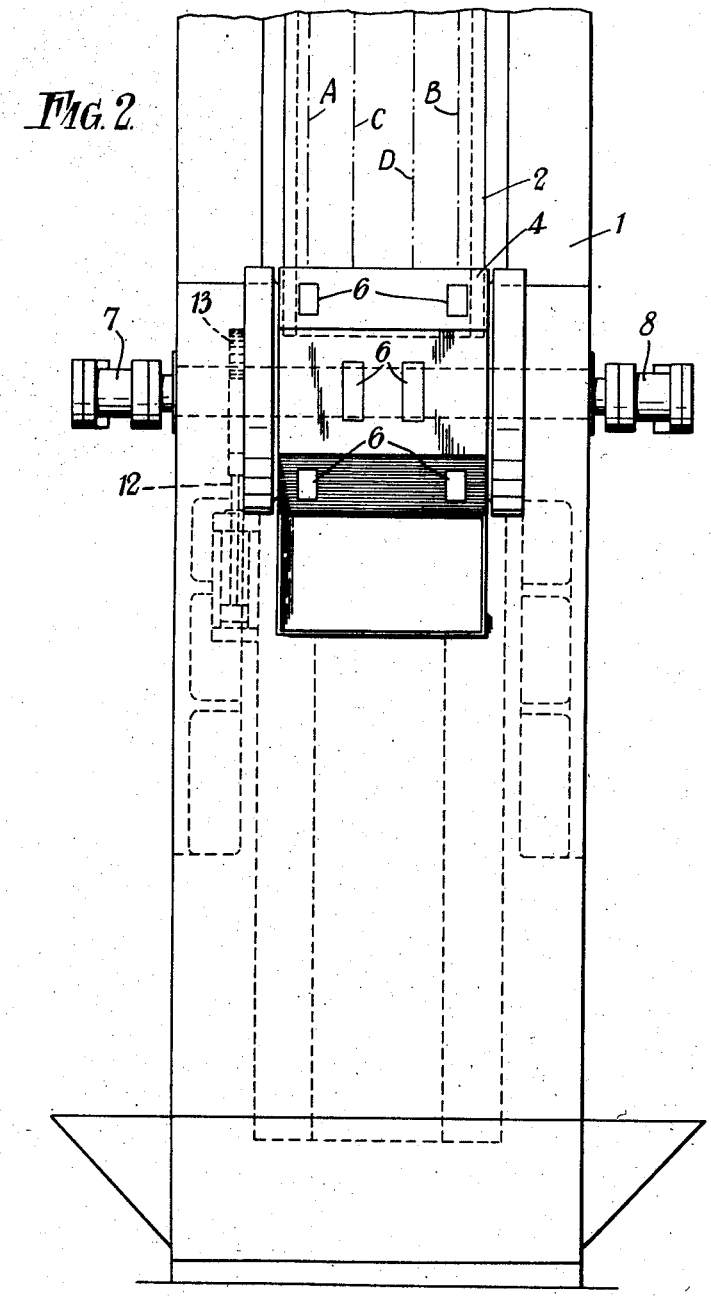

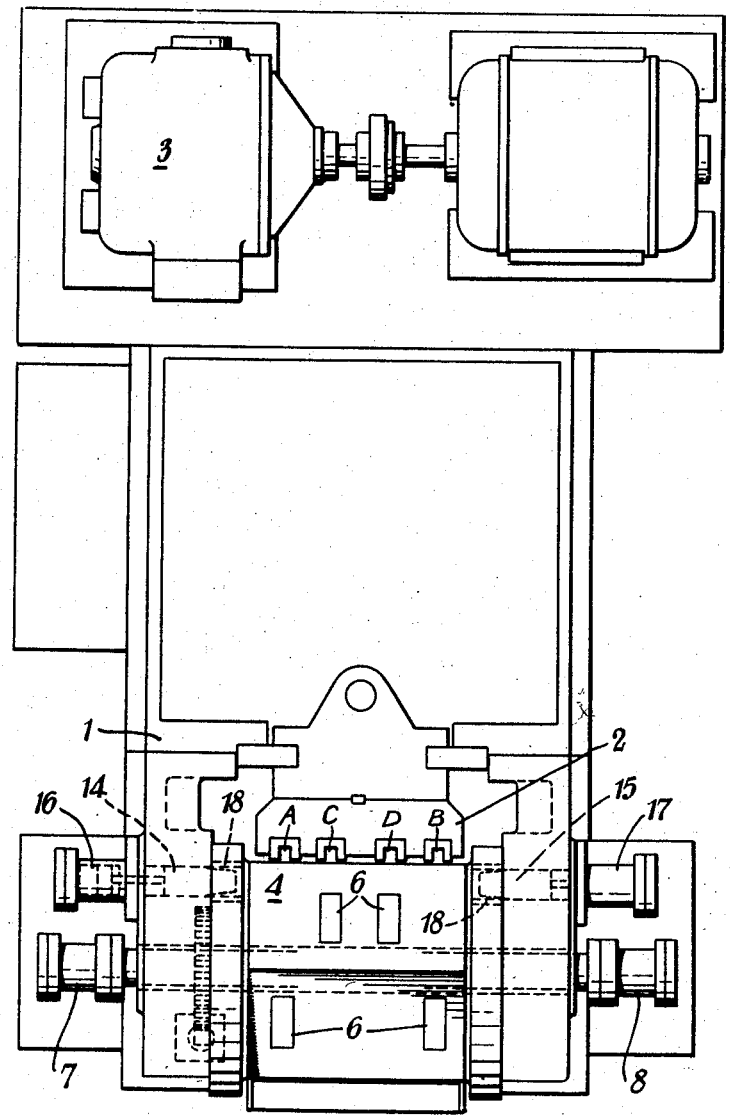

United States Patent Office 2,893,293
Patented July 7, 1959

2,893,293

BROACHING MACHINES

Cyril Edward Poynter, Biggleswade, England, assignor to Weatherley Pelgear Limited, Biggleswade, Bedfordshire, England Application June 11, 1956, Serial No. 590,426

Claims priority, application Great Britain June 9, 1955

1 Claim. (Cl. 90—33)

This invention is concerned with improvements in broaching machines.

It has been common practice to provide broaching machines with rotatable work-holding tables capable of holding a number of work pieces and arranged to be indexed to carry one after another of such pieces into operative relationship with a broach bar. Such tables have been mounted for rotation on an axis parallel to the line of movement of the broaching tool and the work has been mounted on the upper face of the table.

According to the present invention, from one aspect, a broaching machine is provided with a drum-shaped rotatable work-holding table arranged for rotation about an axis which is substantially at right angles to the line of movement of the broaching tool and is substantially parallel to the face of the broach bar slide.

According to the invention, from another aspect, a broaching machine is provided with a drum-shaped rotatable work-holding table provided with work-holding fixtures on its peripheral surface.

The expression drum-shaped is used to include shapes of polygonal cross-section.

From yet another aspect the invention provides a broaching machine having a drum-shaped rotatable work-holding table mounted for rotation about an axis which is substantially at right angles to the line of movement of the broaching tool and substantially parallel to the face of the broach bar slide, the said table being arranged to be indexed between strokes of the broaching tool and being provided with work holding stations on at least two of a plurality of faces composing its peripheral surface.

The broaching machine may be arranged with a substantially vertical working stroke, in which case the axis of rotation of the table is substantially horizontal; or the machine may have a substantially horirzontal working stroke, in which case the axis of rotation of the table is substantially vertical.

The broaching machine may be arranged to perform a cutting operation on only one stroke or on both strokes of the slide.

Where the machine cuts on only one stroke the rotatable table may be indexed at the conclusion of the working stroke to present a face permitting a free return of the tool or tools and be indexed a second time at the conclusion of the idle stroke to bring a fresh work-piece or work-pieces into operative position in the path of the tool or tools.

Alternatively the rotatable table may be shuttled in a linear direction at the conclusion of a working stroke to clear a path for the return of the tool or tools and be indexed only once to bring a fresh work-piece into correct position before being shuttled back for the next working stroke.

In the former case, with a six sided drum shaped table, for example three alternate peripheral faces would be provided with work clamping means and these faces would be indexed on sequence into a position adjacent and parallel to the slide face for a working stroke, while the three empty faces would be indexed in sequence into a similar position for a return stroke.

Where a shuttling movement of the table is provided for it is possible to load every face of a polygonal cross-sectioned drum shaped table with a work-piece.

Where the machine is arranged to perform work on both forward and return strokes it is possible to have work clamping means on all the faces of the drum-shaped table. One set of tools on the broach bar slide are displaced transversely from another set of tools and the work holding stations on alternate faces of the table are similarly displaced, so that a set of tools operative on a forward stroke passes freely between work-pieces clamped in position for machining on a return stroke.

It is also possible in any of the above arrangements to provide for a linear shifting of the table transverse to the line of movement of the broaching tools between operative strokes thereof, so that progressive cuts may be made on a single work-piece by transversely spaced tools on sequential operative strokes without unclamping it from its station.

The indexing of the rotatable table and its linear shuttling movement, when employed, may be derived from a hydraulic, electric, mechanical or pneumatic power source.

The clamping of the work-pieces in their stations may be by wedges or taper pins operated by any of the above power sources.

The work-table is preferably locked in operative position by axially movable tapered bolts or pins which are arranged to provide a substantial proportion of the reaction to the cutting force.

The invention provides certain inherent advantages over known types of broaching machines of which the following are noteworthy: Work-pieces may be automatically ejected to fall into a chute located beneath the table by gravity; since every work-holding face of the table passes through a position where it is inverted or perpendicular, all swarf will clear itself by gravity without washing or blowing; where a vertical stroke machine is employed, the loading of work-pieces either by hand or automatically is facilitated since the work holding stations are brought successively into a conveniently inclined position at the front of the machine; this last feature also makes the improved machine particularly suitable for feeding with work from a conveyor.

The above and other parts of the invention are embodied in one or other of two types of improved broaching machine which will now be described by way of example with reference to the accompanying drawings in which:

Fig. 1 is a diagrammatic side elevation,
Fig. 2 is a similar front elevation,
Fig. 3 is a plan.

The first type of machine is designed to perform work on each stroke of its slide.

This machine has a conventional supporting frame 1 for a vertically reciprocable slide 2.

The slide is operated by a hydraulic ram (not shown) pressurised in known manner from a motor driven pump 3, which also provides hydraulic pressure for other operations to be described hereafter.

A drum-shaped work-holding table 4 is mounted for rotation on a hollow horizontal shaft 5 at the front of the machine.

The drum 4 is of hexagonal cross-section and each of its peripheral faces is provided with two work-holding stations 6 spaced along its axial length. The stations on one face are located near the centre thereof and the stations on an adjacent face are located near the ends thereof.

Each work-holding station includes work clamping means which may be manually operable but which is preferably operated automatically.

The automatic clamping of the work, in the particular machine now being described, is performed by a pair of hydraulically operated rams 7 and 8 located at opposite ends of the hollow shaft 5 and actuating clamps such as the pivoted arms 9, 10 through push rods on axial movement of cam or wedge faces on their piston rods, these parts are all conventional and are not shown. However, it is envisaged that other automatic clamping means may be found more suitable for some applications, for example wedge pieces driven home mechanically by externally positioned cam faces on rotation of the drum may be employed.

Ejection of the work-pieces is also automatic and is arranged to take place above a chute 19 beneath the drum. The ejection may be accomplished by slackening the arms 9, 10.

The drum 4 is rotated through 60° at the end of each stroke of the slide 2 by means of a vertically operating hydraulic piston 11 whose rod 12 engages teeth 13, pins or the like projecting from a side face of the drum.

Tapered bolts 14 and 15 (Fig. 3) of substantial section operated by hydraulic rams 16 and 17 are withdrawn from two of a series of tapered axial holes 18 in the side faces of the drum before an indexing rotation thereof and are entered into a subsequent pair of such holes on the completion of an indexing movement of the drum.

The rams 16 and 17 actuating the bolts are mounted on substantial support brackets near the face of the slide 2 and are designed to withstand the greater part of the force imparted to the drum by a working stroke.

Four sets of broaching tools are mounted on the slide 2. Two sets of tools A and B (aligned with the outer work holding stations 6 on the drum) are arranged to operate upon work-pieces on a downward stroke of the slide 2; and the other two sets of tools C and D (aligned with the inner stations 6) are arranged to perform work on an upward stroke of the slide 2.

In operation a pair of work-pieces is loaded into each pair of stations 6 as the faces carrying those stations are indexed into a position 120° before the position (parallel to the face of the broach slide) where machining takes place.

The drum 4 is unlocked by withdrawal of the bolts 14 and 15, indexed through 60° by the piston 11 and re-locked between every stroke of the slide 2, also one set of clamping means 9, 10 is operated to grip loaded work-pieces and one set of ejecting means is operated to un-load machined pieces into the chute 19 beneath the drum.

A pair of stations 6 aligned with the outer sets of tools A and B is indexed into operative position at the end of each upward stroke and a pair of stations 6 aligned with the inner sets of tools C and D is indexed into operative position at the end of each downward stroke. In this way a pair of work-pieces is machined on every stroke of the slide.

A machine substantially as above described may be arranged to perform work on only one of the strokes of the slide. In such a case alternate faces of the drum would have work-holding stations and a blank face of the drum would be indexed into position before the face of the slide on the conclusion of a working stroke to permit free return of the sets of tools on an idle stroke.

In an alternative form of machine generally similar to that above described the work-holding drum and its operating, clamping and ejecting gear are all carried on a table arranged for linear reciprocation away from and towards the slide face in conventional manner.

In such a machine the table is shuttled away from the slide on the conclusion of a working stroke to give free passage for tools carried by the slide on an idle stroke. In this way it is possible to have all the faces of the drum loaded with work successively since there is no necessity to provide a blank space for the return of the tools.

It will be understood that the invention is not restricted to the details of the specific embodiment described which may be varied without departing from the scope of the following claim.

I claim:

A broaching machine comprising a broach bar, a slide supporting said broach bar for longitudinal reciprocation, at least two broaching tools disposed in laterally spaced relation longitudinally on said broach bar, a drum shaped work-holding table mounted for rotation about an axis which is substantially at right angles to the line of movement of the broach bar and is substantially parallel to the face of the broach bar slide, means for intermittently indexing said table about its axis between strokes of said tool to bring adjacent peripheral areas of said table successively into operative relation with said broaching tools, work-holding means on said peripheral areas of said table with said holding means on alternate peripheral areas operatively aligned with one of the broaching tools, and the work-holding means on the intermediate areas operatively aligned with the other of the broaching tools.

References Cited in the file of this patent

UNITED STATES PATENTS

| | | |
|---|---|---|
| 848,192 | Morton | Mar. 26, 1907 |
| 1,306,266 | Luster | June 10, 1919 |
| 2,002,924 | Romaine et al. | May 28, 1935 |
| 2,024,254 | Romaine et al. | Dec. 17, 1935 |
| 2,039,480 | Floeter | May 5, 1936 |
| 2,043,420 | Roehm | June 9, 1936 |
| 2,072,563 | Lynch et al. | Mar. 2, 1937 |
| 2,270,741 | Rovick | Jan. 20, 1942 |
| 2,751,823 | Freter | June 26, 1956 |

FOREIGN PATENTS

| | | |
|---|---|---|
| 189,587 | Germany | Oct. 17, 1907 |
| 931,383 | Germany | Aug. 8, 1955 |

UNITED STATES PATENT OFFICE

CERTIFICATE OF CORRECTION

Patent No. 2,893,293                                              July 7, 1959

Cyril Edward Poynter

It is hereby certified that error appears in the above numbered patent requiring correction and that the said Letters Patent should read as corrected below.

In the grant, lines 2 and 12, and in the heading to the printed specification, line 4, name of assignee, for "Weatherley Pelgear Limited" read -- Weatherley Oilgear Limited --.

Signed and sealed this 29th day of March 1960.

(SEAL)
Attest:
KARL H. AXLINE
Attesting Officer

ROBERT C. WATSON
Commissioner of Patents